April 27, 1965
D. L. RANDALL ETAL
3,180,990
SELF-CORRECTING HYDROGEN LAMP
Filed Sept. 28, 1962
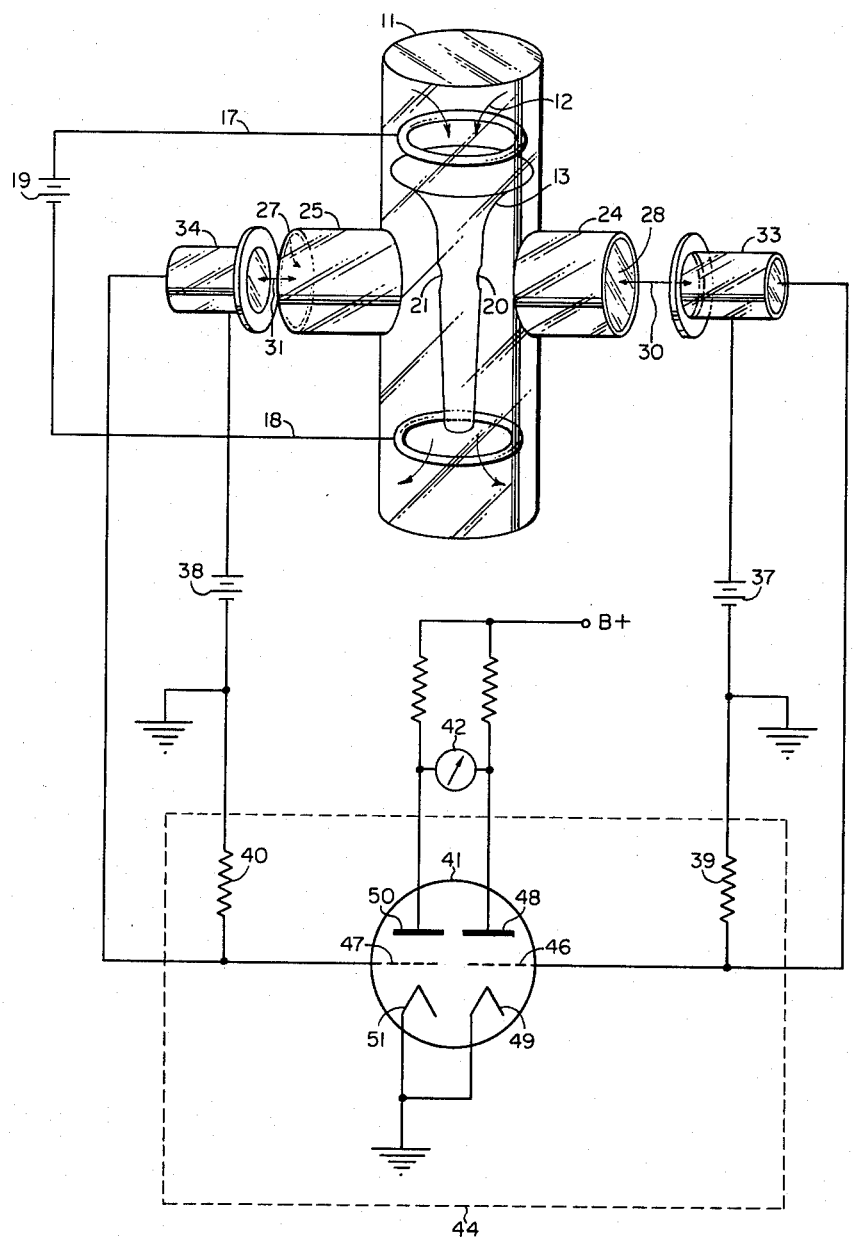
INVENTORS
DWIGHT L. RANDALL
THURE E. HANLEY
OLIVER K. LARISON
JOSEPH KERVITSKY
BY C. E. Vantrain Jr., Agent
Richard Reed
ATTORNEY 3,180,990
SELF-CORRECTING HYDROGEN LAMP
Dwight L. Randall, 312 N. Edison St., Arlington, Va.;
Thure E. Hanley, 5245 Joan Lane, Temple Hills, Md.;
Oliver K. Larison, 6327 N. Elkins Ave., Oxon Hill, Md.;
and Joseph Kervitsky, 308 Virginia Hills Ave., Alexandria, Va.
Filed Sept. 28, 1962, Ser. No. 227,678
9 Claims. (Cl. 250—83.3)
(Granted under Title 35, U.S. Code (1952), sec. 266)

The invention described herein may be manufactured and used by or for the Government of the United States of America for governmental purposes with the payment of any royalties thereon or therefor.

This invention relates in general to means for determining the moisture content of air, and more particularly to a humidiometer which uses the absorption characteristics of Lyman-Alpha radiation for measuring water vapor content.

The use of hydrogen lamps in detecting the moisture content of vapor is well known, such lamps providing a measuring means superior to previous methods of determining moisture content but with severe limitations. In the use of hydrogen lamps as presently known and practiced there is but a single window through which measurement of the moisture content is taken and therefore errors are introduced because of the output drift of such tubes and the fact that the error due to drift must be calculated and applied to the results before reliable readings may be obtained. The correcting of such errors is an unduly lengthy and complex process and has rendered the hydrogen lamp less useful than could be realized.

A humidiometer which is free of the defects of the drift and transmission error, and which will give a fast time response and operate at any temperature or altitude in an atmosphere having the same composition as that at the surface has long been desired. Further, there is a need for a humidiometer to detect the pressure of sharp moisture gradients which cause anomalous propagation of electromagnetic energy at microwave frequencies, and for the detection of "blobs" or other small cells of moisture which produce scattering of electromagnetic energy at microwave frequencies.

The humidiometer of the present invention avoids the serious defects of previous humidiometers and provides an instrument which will measure moisture content under conditions and at sensitivities not previously reached.

Accordingly, it is an object of the present invention to provide a humidiometer which is free from errors due to Lyman-Alpha output drift radiation transmission.

It is the further object of the present invention to provide a humidiometer of light weight, small size, and inexpensive construction which is nevertheless practical for a radiosonde humidity element.

It is a further object of the present invention to provide a humidiometer having a fast time response and operable at any temperature or at any altitude in an atmosphere having a composition the same as that at the surface.

It is a still further object of the present invention to provide a humidiometer capable of measuring ozone at about the altitude of 75,000 feet where water vapor is negligible and ozone is abundant.

It is a still further object of this invention to provide a humidiometer capable of distinguishing and measuring the pressure of water vapor at temperatures below freezing.

Other objects and advantages of this invention will become apparent upon a careful consideration of the following description when read in conjunction with the accompanying drawing wherein hydrogen tube 11 produces Lyman-Alpha radiation by ionization of hydrogen gas and flow of such ionized gas as indicated by arrows 12 through a focusing tube 13 supported within the hydrogen tube. Electrodes 17 and 18 are connected to battery 19 and produce ionization and flow of the gas which result in a glow discharge. The glow discharge, which is Lyman-Alpha radiation, is directed transverse to the flow of gas by apertures 20 and 21 through transverse extensions 24 and 25 of hydrogen tube 11. Lithium fluoride windows 27 and 28 are placed across the ends of the extensions to transmit the Lyman-Alpha radiation across measuring path 30 and reference path 31 into nitric oxide chambers 33 and 34 respectively. The nitric oxide chambers are connected in series with, respectively, batteries 37 and 38, resistors 39 and 40, and the grids 46 and 47 of dual triode 41. Panel 44 represents schematically a differential electrometer amplifier, such as the commercially available Keithley Model 603 differential electrometer amplifier or its equivalent, and a meter 42 which indicates the presence and amount of moisture in the air in the measuring path.

The invention thus includes a humidiometer having a hydrogen tube which radiates at 1215.6 A. across a pair of paths to a pair of nitric oxide detectors having associated with them a metering circuit. Radiation from the hydrogen tube is directed through lithium fluoride windows across a measuring path and a reference path, and through lithium fluoride windows into nitric oxide detector tubes. By photo-ionization, this radiation causes current to flow in the metering circuit associated with the nitric oxide detector tubes.

In the present invention, the use of dual nitric oxide tubes and of a measuring path and a standard path serve to make the humidiometer self-correcting as far as hydrogen lamp current drift and transmission errors are concerned. That is, since the nitric oxide detectors are connected to a common point, errors which are common to both nitric oxide detectors cancel each other and thus provide an instrument whose readings are free from such errors. The differential electrometer amplifier, which in effect is a differential amplifier responsive to currents of the order of $10^{-8}$ amperes, is indicated as within the area of the dashed lines 44. The illustration does not show all components but merely schematically represents the functions of available differential amplifiers.

The length of measuring path 30 is a multiple of the length of standard path 31 thus providing for comparison of desired degrees of difference in moisture content of samples. Otherwise, the device may be symmetrical as to the nitric oxide detectors, the extensions of the tube at 24 and 25, power supplies 37 and 38, and the internal circuits of the differential electrometer amplifier.

In operation, for example, where the moisture content of air in the measuring path 30 is different from moisture content in the standard or reference path 31, a lesser amount of Lyman-Alpha radiation will reach nitric oxide detector 33 than will reach detector 34. The lesser radiation reaching 33 will cause a smaller current to flow in the circuit associated with detector 33 than in the comparable circuit of detector 34 causing grid 46 of tube 41 to be operated at a lower potential than grid 47 associated with detector 34. With grid 46 at a lower potential than grid 47, current from anode 48 to cathode 49 and thence to ground will be less than that from anode 50 through cathode 51 to ground. This will cause an imbalance between the anodes and a resulting current flow from anode 50 to anode 48 through meter 42. Such current flow is detected by meter 42 and its intensity is measured and indicated, such being an indication of the amount of moisture in measuring path 30.

The present invention has a response time of about $\frac{1}{10}$ of a second as limited by the associated metering system, its sensitivity, with a selected tube spacing of 2 centimeters, decreasing as relative humidity increases to 80%. The device in its present embodiment will measure relative humidity from about 80% to 5% with respect to a saturation vapor pressure corresponding to a temperature of 72° F. The tube is especially sensitive to and useful for measuring small amounts of water vapor, that is, where small currents are received through the nitric oxide chambers.

Obviously many modifications and variations of the present invention are possible in light of the above teachings. It is therefore to be understood that within the scope of the appended claims the invention may be practiced otherwise than as specifically described.

What is claimed is:

1. A humidiometer comprising a hydrogen gas discharge tube having a gas therein for producing radiation of the order of 1215.6 angstroms, said hydrogen gas tube having transverse extension means for permitting travel of said radiation in at least two selected directions, at least two detection means positioned to intercept said radiation in each of said directions, said detection means spaced to form a reference space in one radiation path and a measuring space in another, the length of said measuring space being a multiple of the length of said reference space, and differential electrometer amplifier means connected to said detectors for detecting an imbalance in current therein when a difference exists in the water vapor content of the air in said reference path and the air in said measuring path.

2. A humidiometer comprising a gas tube having a focusing tube therein, hydrogen gas in said tube, means for producing a glow discharge of said hydrogen gas, at least two extension means transverse to the flow of said gas, windows at the faces of said extension means remote from said focusing tube for transmitting light in the ultra-violet region, a measuring path adjacent to one of said faces and a reference path adjacent the other, radiation detectors adjacent to said measuring path and said reference path, and differental electrometer means connected to said detectors for detecting an imbalance in current therein when a difference exists in the water vapor content of the air in said reference path and the air in said measuring path.

3. A humidiometer comprising a gas tube having a focusing tube therein, a gas in said gas tube for producing radiation of the order of 1215.6 angstroms, aperture means in said focusing tube for permitting travel of said radiation in at least two selected directions, window means in said gas tube permitting passage therethrough of said radiation, at least two detection means each positioned a selected distance from and opposite a respective one of said window means and forming a reference space opposite one window means and a measuring space opposite another, the length of said measuring space being a multiple of the length of said reference space, and differential electrometer amplifier means connected to said detectors for detecting an imbalance in current therein when a difference exists in the water vapor content of the air in said reference path and the air in said measuring path.

4. A humidiometer comprising a hydrogen tube having a focusing tube therein, means for producing a glow discharge of the hydrogen gas in said tube, aperture means in said focusing tube for permitting travel of said radiation in at least two selected directions, window means in said gas tube permitting passage therethrough of said radiation, at least two detection means each positioned a selected distance from and opposite a respective one of said window means and forming a reference space opposite one window means and a measuring space opposite another, the length of said measuring space being a multiple of the length of said reference space, and differential electrometer amplifier means connected to said detectors for detecting an imbalance in current therein when a difference exists in the water vapor content of the air in said reference path and the air in said measuring path.

5. The device claimed in claim 4 wherein said window means is composed of lithium fluoride crystals and said detection means are nitric oxide chambers.

6. A hydrogen gas discharge tube comprising:
 (a) a cylindrical tube having hydrogen gas therein for producing radiation of the order of 1215.6 angstroms and having cylindrical transverse extensions having outputs to a reference path and a measuring path, the length of said measuring path being a multiple of the length of said reference path,
 (b) a focusing tube within said cylindrical tube having apertures for directing said radiation in two selected directions into said transverse extensions,
 (c) electrode means, through which the gas flows, at each end of said focusing tube for producing ionization of said hydrogen gas,
 (d) a source of ionizing potential connected to said electrodes, and
 (e) lithium fluoride windows covering the outputs of said transverse extensions.

7. A hydrogen gas discharge tube as in claim 6 in which the electrodes are circular electrodes.

8. A hydrogen gas discharge tube as in claim 6 in which the focusing tube is funnel-shaped.

9. A hydrogen gas discharge tube as in claim 7 in which the focusing tube is funnel-shaped.

References Cited by the Examiner
UNITED STATES PATENTS

| 2,813,981 | 11/57 | Friedman | 250—83.3 X |
| 2,878,388 | 3/59 | Bergson | 250—83.3 X |
| 2,901,625 | 8/59 | Friedman et al. | 250—83.3 X |

RALPH G. NILSON, Primary Examiner.

ARCHIE R. BORCHELT, Examiner.